June 2, 1970 L. R. SPERBERG 3,515,181
MEANS FOR TRANSFERRING CHEMICAL INTO A PNEUMATIC TIRE
Filed Sept. 5, 1967
FIG. 1
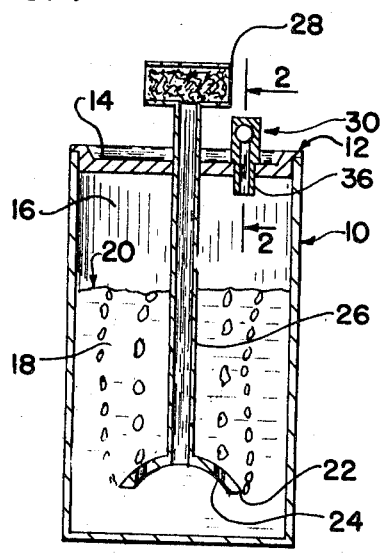
FIG. 2
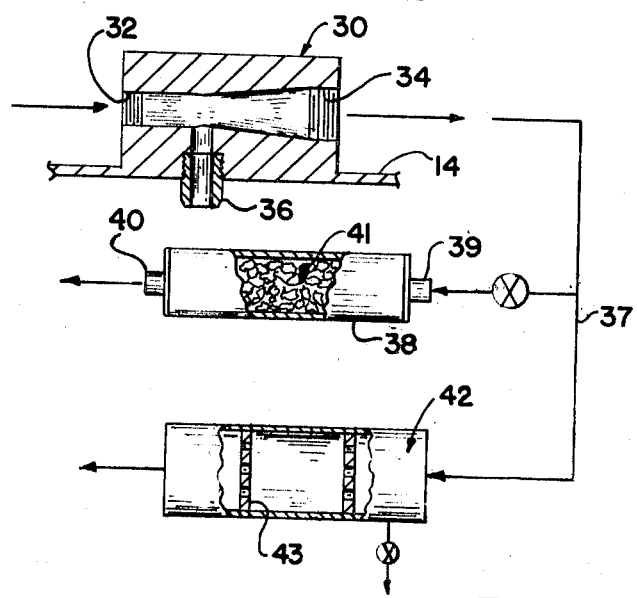
FIG. 3
FIG. 4
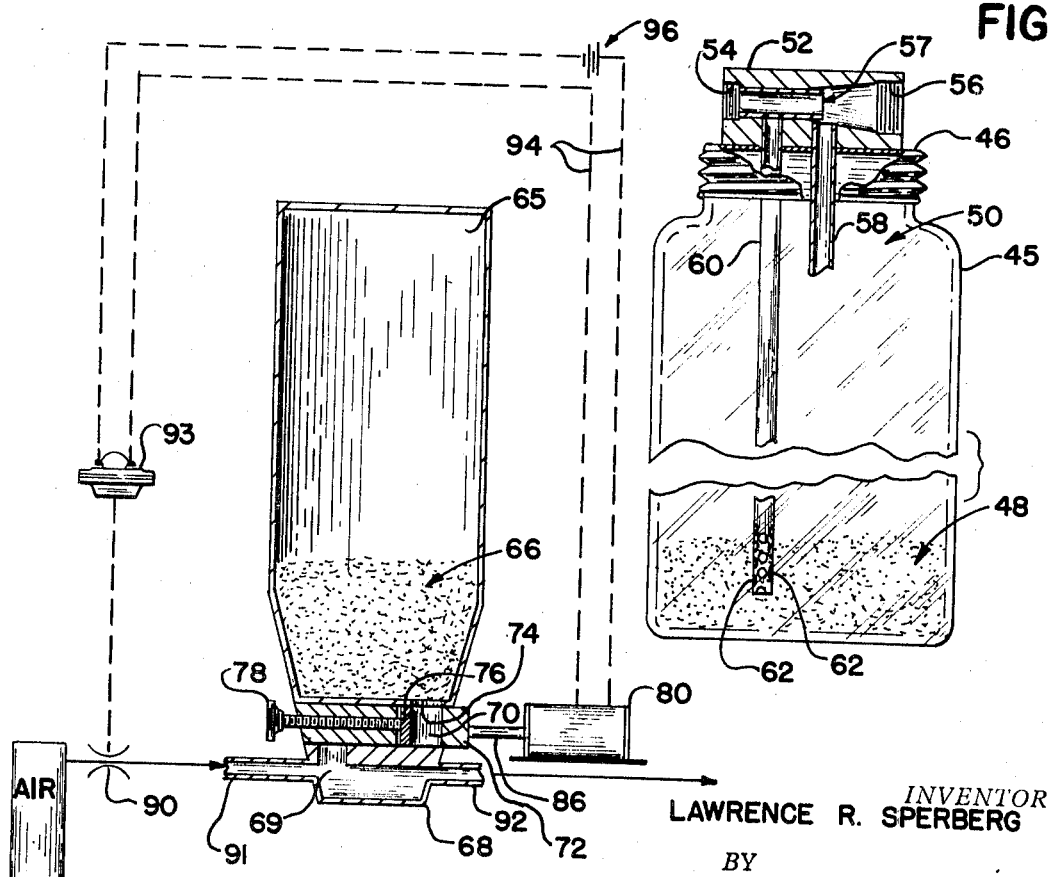
INVENTOR.
LAWRENCE R. SPERBERG
BY
MARCUS L. BATES

United States Patent Office 3,515,181
Patented June 2, 1970

3,515,181
MEANS FOR TRANSFERRING CHEMICAL INTO A PNEUMATIC TIRE
Lawrence R. Sperberg, 6740 Fiesta Drive, El Paso, Tex. 79912
Filed Sept. 5, 1967, Ser. No. 665,607
Int. Cl. B65b 31/00
U.S. Cl. 141—38                    6 Claims

ABSTRACT OF THE DISCLOSURE

An apparatus which may be placed in series with a tire inflating flow line for the purpose of inflating a pneumatic tire with air associated with a chemical substance which reacts with the oxygen contained within the inflating medium to thereby provide an inert atmosphere within the air chamber of the tire. The apparatus includes a chemical containing reservoir having means associated therewith for transferring a predetermined amount of chemical into a predetermined volume of air to thereby assure complete removal of the free oxygen from the air chamber of the tire.

BACKGROUND OF THE INVENTION

Pneumatic tires are universally inflated with compressed atmospheric air. The oxygen component of the compressed air drastically reduces the durability of the tires as well as increasing the wear rate due to the oxidative degradation reaction. A tire may be filled with an inert gas thereby causing the durability to be greatly increased as compared to a tire having oxygen contained within the inflating agent. Helium, carbon dioxide, carbon monoxide, nitrogen, and the rare gases are suitable inert inflating agents. In heavy industrial regions, nitrogen is the most readily available of these inert gases. The wide spread commerical use of nitrogen as an inflating agent represents a considerable continued investment of capital where bottled compressed nitrogen is used as a source of inert gas. The remaining inert gases are prohibitive in cost from a commercial standpoint.

It is therefore expedient to provide elastomeric chambers, including pneumatic tires, with a readily available source of inert atmosphere to thereby increase the durability and to enhance the safety of the tire, especially when the tire is traveling at high speeds during the summer time when tires are more susceptible to high speed failures.

It is possible to provide a pneumatic tire with an inert atmospheric by the provision of an oxygen scavenger which can be directly added to the air chamber. The scavenger eliminates the effectiveness of the oxygen that causes the oxidative degradation such as normally occurs in an air inflated tire. The scavenger chemically changes the available oxygen of the air contained within the gas chamber of the tire into other chemical compounds whereby the oxygen is rendered inactive since it is converted into an oxide or another inert compound so far as regards the composition of the pneumatic tire.

The oxygen scavengers include the use of both liquids and solids, with the use of hydrazine as a liquid oxygen scavenger; and, a mixture of deoxidized metallic powders along with an inert and a slipping agent to provide a powdered solid scavenger.

The liquid scavenger, hydrazine ($N_2H_4$) enters into reaction with the oxygen in accordance with the following equation:

$$H_2N\text{---}NH_2 + O_2 \rightarrow 2H_2O + N_2$$

As is evident in the above reaction of the hydrazine with the oxygen contained within the inflation agent, no perceptible change in volume occurs since each mole of oxygen consumed by the hydrazine yields on mole of nitrogen, and accordingly the tire pressure will not vary as the reaction occurs within the air chamber of the tire.

In the instance of the use of the powdered solid oxygen scavenger, the pressure within the air chamber of the pneumatic tire will undergo a gradual reduction in pressure as the oxygen component is removed from the gas phase of the chamber. This change in air pressure may be offset by over inflating the tire whereby the reduced pressure brought about by the loss of gaseous oxygen equals the desired or recommended inflation pressure.

Included among the powdered solid oxygen scavengers suitable for use herein are: a mixture of zinc, bentenite clay, and pyrogenic silica; as well as iron powders, deoxidized aluminum metal powder, or magnesium powder, as well as mixtures of any deoxidized metal powder which readily enters into reaction with oxygen. As a specific example of the solid oxygen scavenger; zinc, bentenite, Cab-O-Sil (a pyrogenic silica), and Silicia Gel may be mixed together in a weight ratio of 2:4:1:1 to provide a mixture suitable for practicing the present invention.

It is therefore desirable, especially in remote areas where nitrogen gas is prohibitive in cost, or the storage thereof impractical from a cost viewpoint, to be able to inflate pneumatic tires with an oxygen scavenger in order to provide an inert atmosphere within the elastomeric chamber.

SUMMARY

It is therefore an object of the present invention to provide an apparatus for transferring oxygen scavengers into an elastomeric chamber.

A further object of the present invention is the provision of a means of removing the free oxygen from the inflation medium of an elastomeric chamber.

A still further object of the present invention is the provision of an apparatus which will meter a specific amount of an oxygen scavenger into an air stream to thereby provide a proportionate amount of chemical for the removal of the oxygen component from the air stream.

A still further object of the present invention is the provision of an apparatus which automatically provides the tire inflating flow line with a predetermined amount of oxygen scavenger.

The above objects are attained in accordance with the present invention by the provision of a chemical oxygen scavenger and transferring means therefor which is associated with the inflation means for an air chamber of a pneumatic tire, which meters a specific proportionate amount of liquid or solid scavenger material into the inflating gas to thereby remove the free oxygen therefrom.

BRIEF DESCRIPTION OF THE DRAWINGS

FIG. 1 is a cross-sectional view of a device which utilizes a liquid oxygen scavenger in accordance with the teachings of this invention for removing oxygen from the inflating medium of a pneumatic tire;

FIG. 2 is an enlarged cross-sectional view, taken along line 2—2 of FIG. 1, with additional parts being shown associated therewith and with some parts being further enlarged to more amply show the details thereof;

FIG. 3 is a side elevational view of an apparatus for transferring a powdered solid oxygen scavenger into the air chamber of a pneumatic tire, with some parts being shown in section, and other parts being cut away and removed in order to better illustrate the device or to conserve space; and FIG. 4 is a part cross-sectional and part schematical representation of an inflating system for transferring a metered amount of powdered solid oxygen scavenger into the air chamber of a pneumatic tire, with some parts being cut away or shown in section to better illustrate the device.

Looking now in much greater detail to FIG. 1, the arrow at numeral 10 is seen to indicate a container having a closure means sealed to the top thereof at numeral 12 in order to provide a top 14 for the container, thus leaving a gas space 16 and a liquid containing area 18 within the container. The interface between the liquid and gas phase is seen at 20. A bubble cap 22, which is essentially an inverted saucer having apertures 24 therein, is suitably suspended from a downwardly depending hollow conduit 26. Conduit 26 is supported from the beforementioned top or closure 14 and supports an air filter 28 at the upper depending end thereof. A venturi means 30 is rigidly attached in the manner of FIGS. 1 and 2 to the closure means 14. The venturi includes an inlet 32, an outlet 34, and a passageway 36 which is connected to the low pressure producing area of the venturi. As seen in FIG. 1, passageway 36 connects with the gas space 16.

The device of FIG. 1 may additionally be provided with oxygen indicating device 38, which is operatively connected by a valve means to the tire inflating conduit 37 of the venturi. The indicator 38 includes an inlet 39, an outlet 40, and contains a dry chemical 41 which indicates the presence of oxygen by changing color, wherein the change may be viewed through a transparent wall of the indicating device.

In some instances it is preferred to place a surge tank 42 in series with the inflating conduit 37 to thereby provide a storage means as well as a knock-out drum. Baffles 43 may advantageously be included within the device so as to remove entrained liquid from the inflating gas.

Looking now to the details of FIG. 3 wherein there is seen a powered solid oxygen scavenger containing vessel 45 having a removable closure means 46 operatively mounted to the upstanding open end thereof to thereby form a dust containing portion 48 and a free air space 50. A venturi section 52 having an inlet 54 and an air outlet 56 is operatively mounted to the lid and includes a nozzle 57 for producing a vacuum within the downwardly depending tubular passageway 58. A hollow downwardly depending tube 60 is connected to the high pressure portion of the venturi, and is apertured as indicated at 62.

In the embodiment of FIG. 4, a dust containing hopper 65 is filled with the finely divided metal powder 66 in order to supply a scavenger to the air flow through housing 68. The housing 68 includes a passageway 69 which communicates with the passageway 70 when the plunger 72 is retracted into the plunger receiving portion of the housing. Aperture 74 completes a flow path for the powdered scavenger, which flows from the hopper 65, through passageway 74, cavity 70, passageway 69, and into the housing 68. The movable wall 76 is journaled to a screw threaded bolt having a handle 78 thereon for varying the size of the cavity 70 to thereby control the quantity of chemical which flows into the air chamber of the tire.

Solonoid 80 reciprocates piston 72 within the cylinder which interconnects the housing 68 with the bottom of the hopper 65. The solonoid includes a biasing means which tends to maintain the piston 72 in the illustrated stand-by position of FIG. 4. An air supply 88 is connected by conduit 89 to a venturi 90, which in turn is connected to the inlet 91 of the valve housing. Outlet 92 may be attached to any convenient tire filling means desired. The low pressure portion of the venturi is connected by a flow line to a pneumatic actuated normally open switch 93. The switch 93 includes a check valve and bleed hole arrangement (not shown) so as to provide a time delay action. Pneumatic switch 93 is electrically connected to a source of power 96 and to the beforementioned solenoid by means of electrical conduits 94.

OPERATION

In the operation of the device seen in FIGS. 1 and 2, a suitable air source is connected to inlet 32 with outlet 34 being connected to any convenient tire inflating means. Upon inflating a pneumatic tire, the mass flow of air through the venturi produces a low pressure area at 36 to thereby evacuate gas space 16. Since the container 10 is hermetically sealed by cover 12, a pressure differential between atmospheric and the gas space 16 allows air to flow through air filter 28, through the conduit 26, to where the air bubbles from the aperture provided in the bubble cap 22. The bubbles rise through the liquid 18, which is comprised of a hydrazine and water mixture. The air continues to flow into the gas space 16 carrying entrained droplets of hydrazine and water therewith, while at the same time the hydrazine begins to react with the oxygen contained within the air in accordance with the following chemical reaction:

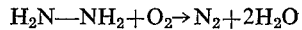

$$H_2N-NH_2 + O_2 \rightarrow N_2 + 2H_2O$$

The treated air flows through passageway 36, outlet 34, and to the tire inflating means where it can be used to inflate a tire.

Where deemed desirable, the tire inflating means can advantageously have a surge tank 42 interposed between the venturi and the final conduit leading to the pneumatic tire. The surge tank 42 provides storage means as well as a water knockout because of baffles or the like located therein in a manner as illustrated at 43. A drain should be provided at the bottom most portion of the surge tank to enable drainage of moisture as it accumulates therein. Oxygen indicating means 41 may be added in the illustrated manner of FIG. 2, whereupon a small side stream taken anywhere between the venturi 30 and the tire inflating means will indicate the effectiveness of the treatment provided by the oxygen scavenger.

Looking now to the operation of FIG. 3, the venturi 52 is connected to any suitable container 45 which is preferably a transparent container to enable the amount of solid powdered scavenger 48 to be maintained at a suitable level. The venturi is interposed within the tire inflation line by means of inlet 54 and outlet 56. Upon inflating a pneumatic tire, the mass flow of air through nozzle 57 produces a low pressure area at passageway 58 to thereby produce a low pressure area at air space 50. Downwardly depending perforated tube 60 is connected to a high pressure portion of the venturi, and the relative size of tube 60 with respect to passageway 58 provides a specific ratio of the flow therethrough with respect to the total mass flow through the venturi. Accordingly, a portion of the energy of the compressed air flowing through the venturi causes a flow to occur through the mixing tube 60 whereupon the finely divided dust which surrounds the tube is well dispersed within the vessel, whereupon flow through passageway 58 transfers a portion of the dust through the outlet 56 of the venturi. The dust is transported along with the inflation gas to thereby provide a pneumatic tire with a metered amount of powdered solid scavenger.

Looking now to the embodiment of FIG. 4 wherein there is disclosed a positive metering device which is adapted to transfer a specific amount of powdered oxygen scavenger material into the inflating flow line each time a tire is inflated. A conventional tire inflating chuck is advantageously placed at outlet 92 and upon filling the tire, flow occurs from source 88, through conduit 89, venturi 90, valve housing 68, and then flows into the tire. The venturi 90 produces a low pressure signal at pneumatic actuated normally open switch 93 whereupon a diaphragm actuated switch moves from the normally open to the closed position. Closure of the switch energizes solenoid 80 which moves piston 72 against a biasing means and in a direction opposite that disclosed so as to align chamber 69 and 70, whereupon the air flowing through the housing 68 carries the powdered chemical (which has previously flowed from hopper 65 into chamber 70) along to the pneumatic tire. Since the time delay portion of pneumatic switch 93 delays the switch in returning to the normally open position, the piston 72 will remain in the described energized spring loaded position for a sufficient interval of time to normally enable one to inflate the tire, even if the air chuck is engaged with the valve stem of the tire several times.

Since various size tires may be inflated with the device, adjustable wall 76 may be adjustably moved within the chamber 70 to thereby change the size of the chamber by merely screwing knob 78 in the desired direction to accomplish this expedient.

While I have shown and described several embodiments of my invention, the foregoing is considered only as illustrative of the principles involved. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In combination with a pneumatic tire, apparatus for inflating the gas chamber of the tire with an inflating medium containing an oxygen scavenger, comprising: a source of air, tire inflating conduit means, and an enclosure containing an oxygen scavenger therein;
    said enclosure including flow conduit means communicating said source of air with said tire inflating conduit means;
    metering means connected to said enclosure for enabling a predetermined quantity of scavenger to be transferred into the tire inflating conduit means to thereby provide the gas chamber of the tire with an inert atmosphere.

2. The apparatus of claim 1 wherein said oxygen scavenger is a liquid which normally forms a liquid and gas phase, and said enclosure includes an inlet and an outlet;
    said inlet includes means forming a first passageway extending below the liquid level of the liquid and through a wall of the vessel and into communication with the atmosphere;
    a diffusor located at the terminal end portion of said first passageway;
    said metering means includes a venturi having an inlet connected to the source of air and an outlet adapted to be connected to said tire inflating means, and means forming a second passageway which interconnects the low pressure area of the venturi with said outlet of said enclosure means;
    whereby: inflation of a tire causes a flow of air to occur through the first passageway, from the diffuser to the gas phase, through the second passageway, and into said venturi whereby the air entrains part of the hydrazine to thereby transport the hydrazine to the tire where oxygen contained therein is removed.

3. The improvement of claim 1 wheerin the oxygen scavenger is a deoxidized powdered metal and said enclosure means is provided with an inlet and an outlet extending through a wall thereof;
    a venturi having an inlet adapted to be connected to the source of air and an outlet adapted to be connected to said tire inflating conduit means;
    said enclosure outlet communicating with the low pressure area of said venturi;
    said enclosure inlet being connected to a high pressure area of said venturi with said enclosure inlet communicating with the lower interior portion of said enclosure;
    whereby: inflating the tire produces a flow through said venturi, whereupon a portion of the flow travels through said enclosure inlet to thereby disperse the scavenger located within said enclosure, whereupon said scavenger flows through said enclosure outlet and into the tire.

4. The improvement of claim 1 wherein the oxygen scavenger contained within the enclosure is a powdered deoxidized metal, and further includes a housing, a plunger, means forming a plunger receiving portion within said housing which enables said plunger to be moved from a normal to a second position therein;
    means forming a main flow passageway through the lower extremity of said housing with one end of the flow passageway being connected to the source of air and the remaining end of the flow passageway being connected to said tire inflating conduit means;
    means forming a cavity within said plunger, means forming an aperture which normally communicates the cavity with the enclosure, means forming a passageway which communicates said main flow passageway with the cavity when the plunger is moved to the second position;
    whereby: movement of said plunger from the normal to the second position causes the powdered deoxidized metal to be transferred from the enclosure to the tire inflating conduit.

5. The improvement of claim 4, and further including a venturi interposed between the source of air pressure and the housing, a pneumatic actuated normally open switch means having time delay means associated therewith and operatively connected to the low pressure area of said venturi;
    a spring biased solenoid means associated with said piston and connected to be actuated by said switch, and including a source of current, whereupon: flow through said housing actuates said switch to the closed position which in turn actuates said solenoid to thereby reciprocate the piston within said cylinder.

6. The apparatus of claim 1 wherein a surge tank is interposed between the pneumatic tire and the chemical injecting means to thereby provide a reservoir for the chemical containing inflating medium.

References Cited

UNITED STATES PATENTS 2,806,767   9/1967   Chenicek _____ 23—4

HOUSTON S. BELL, Jr., Primary Examiner

U.S. Cl. X.R.

23—281; 222—193